TELEPHONE SYSTEM PERMANENT SIGNAL TRUNK

Filed Dec. 26, 1961 3 Sheets-Sheet 1

INVENTORS: A. A. MAYER
T. D. ROBB
BY SEHollander
ATTORNEY

Aug. 17, 1965 A. A. MAYER ETAL 3,201,521

TELEPHONE SYSTEM PERMANENT SIGNAL TRUNK

Filed Dec. 26, 1961 3 Sheets-Sheet 2

INVENTORS A. A. MAYER
T. D. ROBB

BY SE Hollander

ATTORNEY

Aug. 17, 1965 A. A. MAYER ETAL 3,201,521

TELEPHONE SYSTEM PERMANENT SIGNAL TRUNK

Filed Dec. 26, 1961 3 Sheets-Sheet 3

INVENTORS A. A. MAYER
T. D. ROBB
BY
SEHollander
ATTORNEY

United States Patent Office 3,201,521

Patented Aug. 17, 1965

3,201,521

TELEPHONE SYSTEM PERMANENT SIGNAL TRUNK

Arthur A. Mayer, Brooklyn, N.Y., and Theodore D. Robb, Ridgewood, N.J., assignors to Bell Telephone Laboratories, Incorporated, New York, N.Y., a corporation of New York Filed Dec. 26, 1961, Ser. No. 161,905
5 Claims. (Cl. 179—27)

This invention relates to telephone systems and more particularly to means for automatically applying receiver off-hook tone to lines routed to permanent signal trunks in common control offices.

A permanent signal occurs when a subscriber either removes his receiver off-hook and fails to dial any digits for a predetermined time interval, or when he inadvertently leaves his receiver off-hook. Permanent signals may also occur as a result of a cable failure or other trouble causing a cross on the line, but these constitute only a small percentage of total permanents. A permanent signal is manifested by the appearance of a visual indication at an operator's position or maintenance area after a predetermined time-out interval.

When a permanent condition occurs it becomes necessary to attract the customer's attention so that the receiver will be replaced and thereby release the plant facilities. Often the appearance of a permanent signal is followed by:

(1) A challenge by an attendant who is connected to the line for the purpose of asking: "What number are you calling please?"

(2) If a response is received, the attendant proceeds to advise the customer to hang up and dial the call in the usual manner.

(3) If no response is received the attendant applies ringing or howler tone on the line.

(4) If there is no response, the howler key is usually reoperated for two more cycles with a challenge before each operation.

(5) At the end of three cycles of tone, the howler cord is removed from the jack.

(6) Permanents which are still not cleared are plugged up and reported to the central office maintenance force to obtain the line number. This and other pertinent information are then referred to the local test desk.

(7) The local test deskman checks the line, and if necessary, applies the howler tone to try to attract the customer's atention before dispatching a repairman to the customer's premises.

The effect of a high permanent signal rate is often quite serious. Permanents tie up equipment and result in "no dial tone" reports on other lines. Throughout the year and particularly at the year-end holidays, flurries of "no dial tone" reports are experienced. A permanent on a multi-party line, caused by one party's receiver being off-hook, prevents other parties on the line from originating a call. A considerable volume of reports arise from persons attempting to reach lines which are on "permanents" and appear to be busy, thereby increasing the work load on both plant and traffic. And the expense incurred in dispatching a repairman to a customer's premises is high.

We have found that the majority of permanent signals may be eliminated if immediately after the permanent signal time-out period a brief voice challenge is applied followed by a receiver off-hook tone. In the majority of cases, the subscriber hangs up during the early part of the tone period. Accordingly, the invention provides the following:

(1) A ten-second voice challenge is automatically applied to the subscriber line not more than ten seconds after the time-out period, that is, an announcement is applied to the subscriber line within ten seconds after the permanent signal appears.

(2) Immediately following the announcement, if the receiver is not placed on-hook, a receiver off-hook tone is applied to the line. The exact duration of the tone application can vary, a minimum of forty seconds being required, however. Few lines require the application of the receiver off-hook tone for more than seventy seconds.

(3) Those few lines still indicating a permanent signal after the ten-second announcement and the 40–70 second tone are connected to an operator's position.

It is an object of this invention to provide means for effecting a greater and faster hang-up rate for lines exhibiting permanent signals thereon.

It is another object of this invention to automatically apply a recorded voice challenge to a subscriber line evidencing a permanent signal as soon at possible after the permanent signal condition is determined.

It is another object of this invention to automatically apply a 40–70 second tone to a line exhibiting a permanent signal immediately after the termination of the ten-second announcement in the event the subscriber has not yet hung up.

It is another object of this invention to automatically connect the line to an operator's position after the tone application, in the event the subscriber has not yet hung up.

It is another object of this invention to improve customer service by reducing the number of customer complaints due to inability to originate calls because of "no dial" tone and to terminate calls because of busy conditions.

It is another object of this invention to reduce maintenance and traffic costs.

It is still another object of this invention to obtain the foregoing objects with a minimum cost and complexity of equipment.

In accordance with an aspect of our invention the telephone central office is provided with a single permanent signal tone generator and a single announcement machine. The tone generator as well as the announcement machine continuously operate. The announcement, a voice challenge, has a duration of ten seconds. Preceding each announcement, the announcement machine provides a pulse indication. A second type of pulse indication is provided simultaneously with every fourth one of the first pulse indications. Thus, the two types of control pulses occur respectively before each announcement and before every fourth announcement.

The number of permanent signal trunks provided in the central office is dependent upon the number of stations served. The central office equipment, as in conventional systems, connects the line exhibiting a permanent signal condition to one of the permanent signal trunks after a predetermined time-out interval, this interval being in the order of approximately 20 to 40 seconds. The connection of the subscriber line to the permanent signal trunk operates a relay in the trunk circuit. With the appearance of the next control pulse of the first type, appearing before the next announcement, the announcement machine is connected to the subscriber line. Each permanent signal trunk is connected individually to the announcement machine and all the trunks in the office share this common equipment. Upon the appearance of the next pulse of the first type, occurring after one full announcement is applied to the subscriber line, the permanent signal trunk disconnects the announcement machine from the subscriber line and connects the latter to the common tone generator. Each trunk circuit is connected individually to the tone generator and thus the same equipment is shared by all of the permanent signal trunks. The tone is then applied to the subscriber line until two pulses of the second type have occurred. With the appearance of the second pulse of the second type, the subscriber line is disconnected from the tone generator and connected instead to an operator's position associated with the permanent signal trunk in use.

It is apparent that the tone is applied to the subscriber line for a period of 40, 50, 60 or 70 seconds. The upper limit is obtained if the permanent signal trunk is seized during the announcement period preceding the application of both types of control pulses. In this event, the announcement machine is connected to the subscriber line with the appearance of the next pulse of the first type (appearing simultaneously with a pulse of the second type). The tone generator is connected to the subscriber line with the appearance of a second pulse of the first type after ten seconds. The next pulse of the second type does not appear for another thirty seconds and the next pulse of the second type after this one appears after still another forty seconds. Thus, the second pulse of the second type occurring after the connection of the tone generator to the subscriber line occurs after the tone is applied for seventy seconds. At this time, the subscriber line is disconnected from the tone generator and connected to the operator's position.

The lower limit of forty seconds is obtained when the permanent signal trunk is seized during the announcement period beginning twenty seconds before the next pulse of the second type. After this announcement period a pulse of the first type connects the announcement machine to the subscriber line. The announcement is applied to the subscriber line for ten seconds after which pulses of both types appear. The pulse of the first type connects the tone generator to the subscriber line. The pulse of the second type is the first one of the two pulses of this type that must occur before cut-through to the operator's position is effected. The second pulse of the second type, effecting this cut-through, occurs forty seconds later, disconnects the subscriber line from the tone generator, connects the subscriber line to the operator's position, and thus controls a total tone application time of forty seconds.

It is a feature of this invention to provide a common announcement machine, common control pulse circuitry, and a common tone generator for a plurality of permanent signal trunks located in a common control telephone central office.

It is another feature of this invention to ready the seized permanent signal trunk to connect the announcement machine promptly to the subscriber line.

It is another feature of this invention to insure the automatic connection of the announcement machine to the subscriber line at the beginning of the first complete announcement occurring after the seizure of the trunk circuit.

It is another feature of this invention to insure a complete voice announcement before the application of the tone.

It is another feature of this invention to provide means for automatically disconnecting the subscriber line from the tone generator and for connecting it to an operator's position after the application of the permanent signal tone for a predetermined time interval.

It is still another feature of the invention to provide means for automatically releasing the permanent signal trunk at any time upon the hang-up of his receiver by the subscriber.

Further objects, features and advantages of the invention will become apparent upon consideration of the following detailed description in conjunction with the drawing, wherein.

Figure 1:
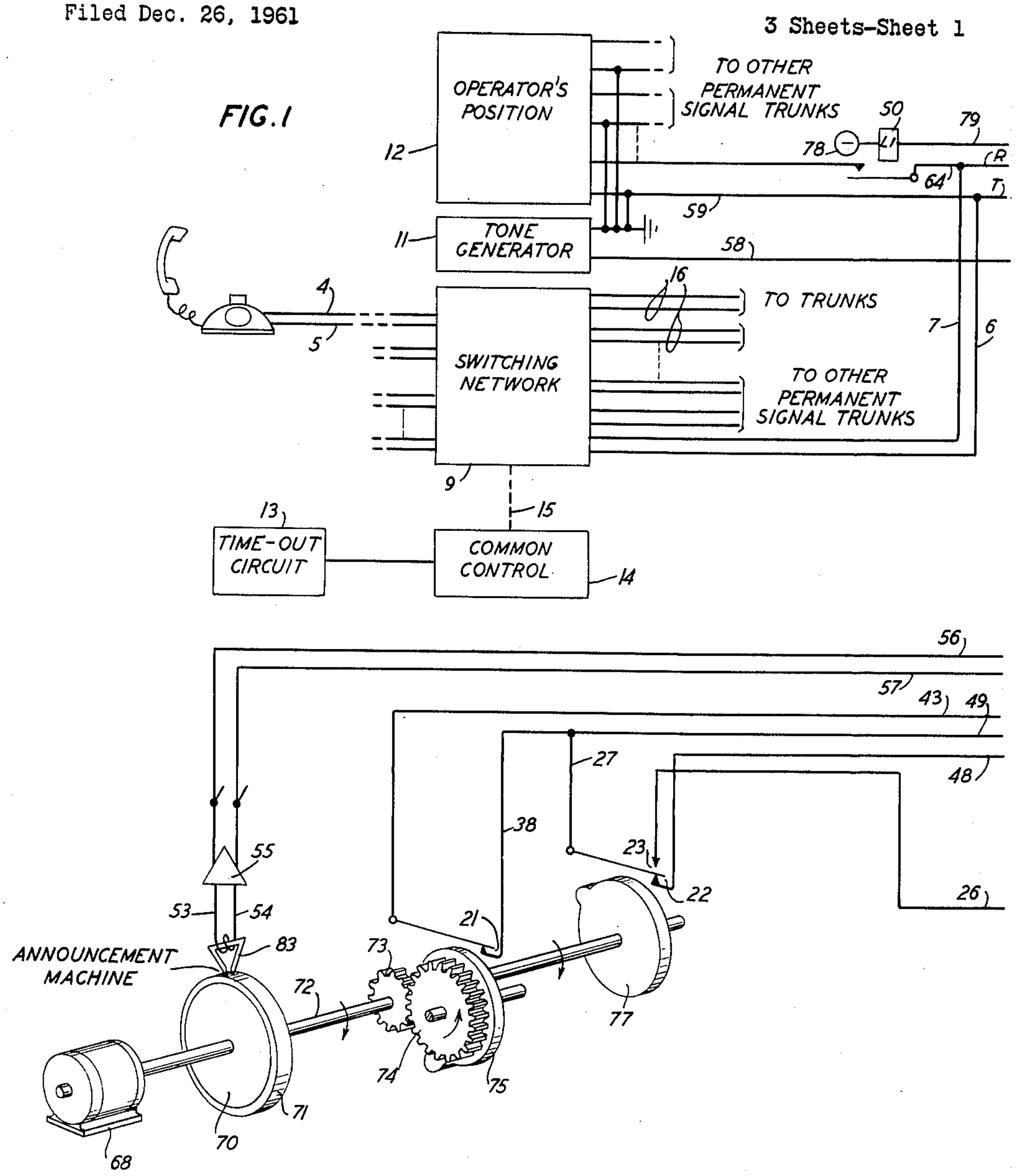
FIG. 1 shows part of a telephone system with which the permanent signal trunk of the invention is employed, and in addition, the common circuitry of the invention.

In the telephone system with which the invention is employed, a plurality of conductor pairs connect respective substations to a switching network 9. Common control circuit 14 controls the operation of switching network 9, this control being shown symbolically by conductor 15. Common control 14 controls the connection of any substation to one of trunks 16, these trunks being outgoing, incoming, or intraoffice trunks, etc.

When a particular substation, such as the one shown connected to conductors 4 and 5, is off-hook, without dialing any digits, a time-out circuit 13 notifies common control 14 that the subscriber should be connected to one of the permanent signal trunks in the office. Time-out circuit 13 is a device for determining that a subscriber is off-hook and no dial pulses have been received during a predetermined interval after the subscriber first went off-hook. In response to the notification of the permanent signal condition by time-out circuit 13, common control 14 connects the particular substation to one of the permanent signal trunks in the office.

In accordance with our invention, the voice announcement apparatus also provides the control signals. In this embodiment this is depicted in FIG. 1 by a motor 68 which drives a shaft 72 causing a disc 70, a cam 77 and a gear 73 to rotate. On the disc 70 is a magnetic tape 71 on which is recorded a "voice challenge." The tape head 83 has induced in it a flux dependent upon the magnetization of the tape 71, and the electrical signals induced on conductors 53 and 54 depend upon the prerecorded message. These signals are amplified by amplifier 55 connected to conductors 56 and 57.

The disc 70 rotates once every ten seconds, the message duration being ten seconds. Each time shaft 72 rotates, cam 77 opens contacts 22. The tape 71 is so arranged that contacts 22 open, followed by the closing of contacts 23, prior to the beginning of each announcement.

The teeth ratio of gears 73 and 74 is 1:4. Consequently, cam 75 attached to gear 74 rotates once for every four revolutions of cam 77. Contacts 21 open once for every revolution of cam 75. The two cams are so arranged that contacts 21 and 22 open simultaneously when the two cams operate together once every four revolutions.

Figure 2:
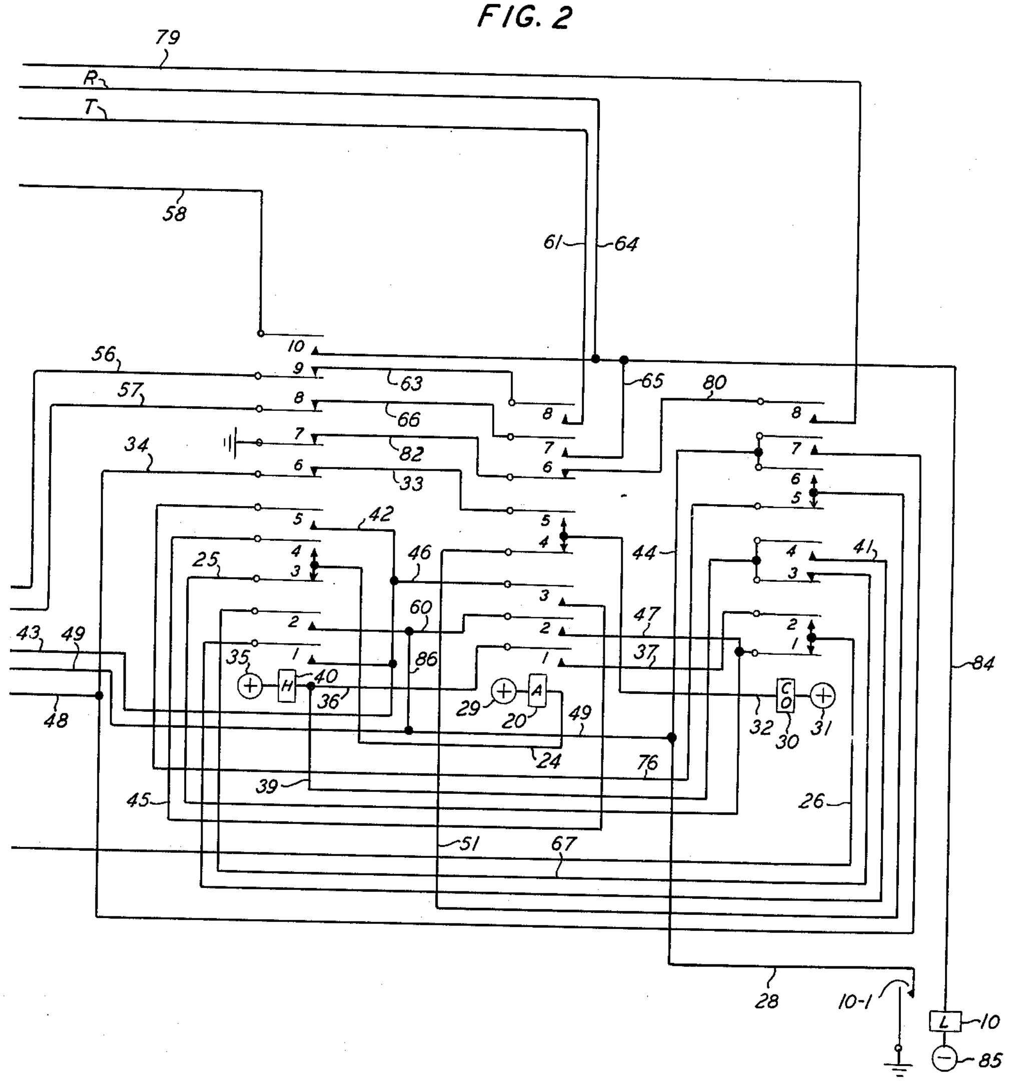
FIG. 2 is an illustrative embodiment of the permanent signal trunk of the invention to be connected to FIG. 1 in an obvious manner.

The motor, shaft, announcement, and cam arrangement, as well as the tone generator 11 and operator's position 12, are common to all permanent signal trunks in the central office. FIG. 2 discloses the control mechanism of a particular permanent signal trunk in the office. Other trunks of this type in the office utilize the same common equipment. That is to say, there are multiple connections on conductors 56 and 57, and cams 75 and 77 operate contacts associated with other permament signal trunks.

Other circuit arrangements and mechanisms for deriving time signals from a voice announcement machine could, of course, be utilized.

In FIG. 1, the off-hook substation shown is connected through switching network 9 to conductors 6 and 7 which in turn are connected to the permanent signal trunk shown in FIG. 2. When this connection is made, current flows from ground, through conductors 59, 6, 7, 64, and 84 to source 85, the L relay 10 energizes, and contacts 10–1 close. The closing of these contacts has no effect on the circuit other than to ground conductor 28.

Upon the first closing of contacts 23 after the grounding of conductor 28, the A relay 20 operates. Current flows from source 29, through the coil of relay 20, conductor 24, normally closed contacts 40–3, conductor 25, normally closed contacts 30–1, conductor 26, contacts 23, conductors 27, 49, and 28, and contacts 10–1 to ground. As cam 77 further rotates, contacts 23 open and would normally cause relay 20 to release. However, a locking path is provided for relay 20, this path comprising conductor 24, normally closed contacts 40–3, conductors 25 and 47, now closed contacts 20–2, conductors 60, 86 and 49, and grounded conductor 28.

When relay 20 operates, contacts 20–7 and 20–8 close. The tip conductor 6 is connected through conductor 61, contacts 20–8, conductor 63, and normally closed contacts 40–9 to conductor 56. The ring conductor 7 is connected by conductors 64 and 65, now closed contacts 20–7, conductor 66, and normally closed contacts 40–8 to conductor 57. The announcement requesting the subscriber to hang up his receiver is thus applied directly to the subscriber's line.

Figure 3:
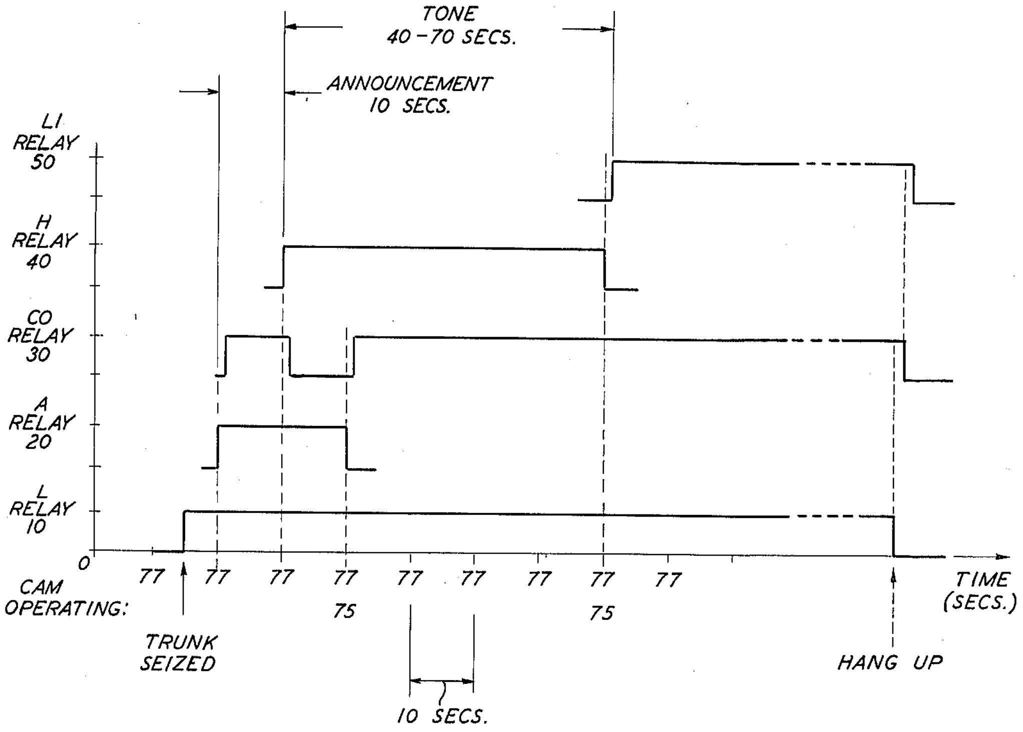
FIG. 3 is a timing diagram disclosing the relative operational states of the various relays of FIGS. 1 and 2.

As seen in FIG. 3, the first operation of cam 77 causes the A relay 20 to operate. The operation of relay 20 causes the operation of the CO relay 30 when cam 77 contacts 23 open and contacts 22 close. Current flows from source 31 through conductor 32, now-closed contatcs 20–5, conductor 33, normally closed contacts 40–6, conductors 34 and 48, contacts 22, and conductors 27 and 49 to grounded conductor 28. At this time, relay 30 locks independent of contacts 22 as conductor 34 is connected to now-closed contacts 30–7, connected by conductor 44 to grounded conductor 28. Normally closed contacts 40–6 are still in the locking path as are also now-closed contacts 20–5.

Relay 40 remains unaffected by the first operation of cam 77. Although conductor 36 is connected through now-closed contacts 20–1 and now-closed contacts 30–2 to conductor 26, contacts 23 are open.

The next operation of cam 77 causes the H relay 40 to operate and relay 30 to release. When contacts 23 close, current flows from source 35 through conductor 36, contacts 20–1 and 30–2, conductor 26, contacts 23, and conductors 27 and 49 to conductor 28. A locking circuit is provided for this relay as contacts 23 open when cam 77 rotates a bit further. This locking path includes contacts 30–3 which are open when relay 40 first energizes. However, relay 30 releases when relay 40 operates and contacts 40–6, in the locking path of relay 30, open. After relay 40 operates, thereby releasing relay 30, a locking path is established for maintaining relay 40 in an operated condition, this path including conductor 39, contacts 30–3, conductor 67, contacts 40–2, and conductors 86, 49 and 28.

After relay 20 was energized by the first operation of cam 77, the relay locked, the locking path including contacts 40–3 which have just opened. However, relay 20 remains locked. When relay 40 operates, contacts 40–4 close. The new locking path for relay 20 includes conductor 24, contacts 40–4, conductor 45, contacts 20–3, conductors 46 and 43, contacts 21, and conductors 38, 49 and 28.

When relay 40 operates, contacts 40–8 and 40–9 open and the announcement is disconnected from the subscriber line. However, contacts 40–10 close and connect conductor 58 to conductor 64. The tone from tone generator 52 is thus applied over conductors 58 and 64 directly to the subscriber line.

After the second operation of cam 77 and the application of the tone to the subscriber line, relays 20 and 40 are operated and relay 30 is not. Further operations of cam 77 have no effect on the circuit. Contacts 22, which are opened by cam 77, are not in the locking paths of relays 20 and 40. And relay 30 does not operate when contacts 23 close as contacts 40–6 are still open.

In FIG. 3, the first operation of cam 75 is shown occurring ten seconds after the second operation of cam 77. The operation of cam 75 with the first operation of cam 77 has no effect on the circuit even when this situation does occur. The first operation of cam 75 which is effective can occur 10, 20, 30, or 40 seconds after the occurrence of the first operation of cam 77. In FIG. 3 it is shown occurring twenty seconds after the first operation of cam 77.

The locking path for relay 20 includes cam 75 contacts 21 and contacts 20–3. When contacts 21 open, relay 20 releases and contacts 20–3 open. Although contacts 21 close as cam 75 rotates a bit further, relay 20 remains unenergized as contacts 20–3 are now open.

Relay 30, on the other hand, operates after relay 20 releases and cam 75 contacts 21 close. Current flows from source 31 through conductor 32, contacts 20–4 after relay 20 releases, conductor 51, contacts 30–5, which are closed until relay 30 operates, conductor 76, contacts 40–5 which are closed, conductors 42 and 43, contacts 21 after cam 75 rotates a bit further, conductors 38, 49 and 28, and contacts 10–1 to ground. Contacts 30–5, in this path, open immediately upon the operation of relay 30. For this reason, a locking path is provided which includes contacts 30–6, this path comprising conductor 32, contacts 20–4, conductor 51, now-closed contacts 30–6, conductors 44 and 28, and contacts 10–1.

Relay 40 remains unaffected by the pulse, that is, it remains locked. The locking path of relay 40 prior to the first operation of cam 75 includes closed contacts 30–3 and 40–2. As relay 30 is energized, the locking path for relay 40 is broken. However, another locking path is now provided. This path includes conductor 39, contacts 30–4, conductor 41, contacts 40–1, conductor 43, contacts 21 when they close, conductors 38, 49 and 28, and contacts 10–1. Relay 40 thus remains locked and the tone is still applied to the subscriber line. The effect of the first operation of cam 75 is to place cam 75 contacts 21 in the locking path of relay 40.

Further operations of cam 77 have no effect upon the circuit. Contacts 22 are not in the locking path of relays 30 and 40 and these relays remain energized. Relay 20 is not operated when contacts 23 close as the only path for current flow from source 29 to ground includes contacts 20–3 which are open.

The second operation of cam 75 causes relay 40 to release. Cam 75 contacts 21 and contacts 40–1 are in the locking path of relay 40. When contacts 21 open, relay 40 releases. Although contacts 21 close once again, contacts 40–1 are open by this time, and consequently the operating path for relay 40 is open and the tone is removed from the subscriber line. Relay 20 cannot reoperate and the announcement is prevented from being applied to the line as long as relay 30 remains operated.

The locking path for relay 30 prior to the second operation of cam 75 includes contacts 30–6, 20–4, and 10–1, all of which remain closed.

At this time, in the event the subscriber has not yet hung up, it is desired to cut the line through to an operator's position 12. Current flows from source 78, through the coil of the L1 relay 50, conductor 79, normally closed contacts 30–8, conductor 80, normally closed contacts 20–6, conductor 82, and normally closed contacts 40–7 to ground. The L1 relay 50 operates and when contacts 50–1 close, one of a plurality of appearances on operator's position 12 is connected directly to conductors 6 and 7. At this time, the operator voice challenges and in the event of failure to attract the subscriber's attention may again apply tone to the line. If the subscriber still does not hang up, the maintenance force is requested to check the line. The line number and the condition of the line are then reported to the local test desk.

Further operations of cams 77 and 75 have no effect on the circuit. Relay 30 remains operated and relays 20 and 40 remain unoperated even though contacts 23 continue to close every ten seconds.

In the event the subscriber hangs up, current cannot flow from source 85 to conductors 84, 64 and 7, and relay 10 releases which in turn causes relay 30 to release. Contacts 30–8 open and relay 50 releases as well, thereby opening contacts 50–1. All five relays in the circuit are thus opened and the circuit is restored to a normal condition and may be seized for operating with another line exhibiting a permanent signal.

At any time during the sequence, hang-up by the subscriber effects the restoration of the circuit to the normal condition. The locking path of relays 20, 30 and 40 all include contacts 10–1. Consequently, the release of relay 10 and the opening of contacts 10–1 restores the circuit to normal at any time during the sequence when the subscriber hangs up.

In the event the subscriber fails to hang up, the operator disconnects from the permanent signal trunk so as to be able to challenge on other permanent signals appearing at her position and to perform whatever other central office operations may be additionally assigned that operator's position. The subscriber remains connected, however, to this particular permanent signal trunk until his phone is returned to the on-hook condition. Accordingly, additional on-hook conditions arising in the office on other subscriber lines are routed, by the common control, to other permanent signal trunks as the appearance of this trunk at the switching network 9 remains busy.

It is thus seen that a completely automatic application of a ten-second announcement is applied to the subscriber line within ten seconds after the seizure of the permanent signal trunk. One complete announcement is provided, cut-through from the announcement machine to the subscriber line being effected only immediately prior to the beginning of a complete announcement. A 40–70 second tone is automatically applied to the line immediately after the ten-second announcement in the event hang-up has not been effected by the announcement alone. And finally, after the application of the tone to the line for a 40–70 second period, cut-through to an operator's position is automatically provided. The permanent signal trunk is restored to normal by the hang-up of the subscriber at any time during the entire sequence and is thus made ready for use with another "permanently" off-hook subscriber.

It is understood that the embodiment shown is merely exemplary and that various modifications will be apparent to those skilled in the art without departing from the spirit and scope of the invention.

What is claimed is:

1. A permanent signal trunk comprising an announcement machine, means controlled by said announcement machine for providing first type pulses, each occurring between two successive announcements, and second type pulses occurring at a slower rate than said first type pulses, relay means operative in response to the connection thereto of a subscriber line, means responsive to the first pulse of said first type occurring after the operation of said relay means for connecting said announcement machine to said subscriber line, a tone generator, means responsive to the second pulse of said first type occurring after the operation of said relay means for disconnecting said announcement machine from said subscriber line and for connecting said tone generator to said subscriber line, an operator's position, and means responsive to the occurrence of two successive pulses of said second type after the operation of said relay means for disconnecting said tone generator from said subscriber line and for connecting said subscriber line to said operator's position.

2. A permanent signal trunk for applying to a permanent signal line an announcement having a first time duration, for thereafter applying to said line a tone for a second time duration, and for then connecting said line to an operator's position comprising means connected to an announcement machine, said announcement machine repetitively supplying said announcement having said first time duration to a plurality of permanent signal trunks, means connected to a tone generator, said tone generator supplying a tone to said plurality of permanent signal trunks, an operator's position, means for registering the connection of said line to the trunk circuit, means responsive to the operation of said registering means and the next termination of an announcement occurring after said operation for connecting said line to said announcement machine whereby said line is connected to said announcement machine at the beginning of an announcement and within a time period equal to said first time duration after the operation of said registering means, means for disconnecting said line from said announcement machine at the termination of the announcement applied to said line and for connecting said line to said tone generator, and means for disconnecting said line from said tone generator after said tone has been applied to said line for said second time duration and for connecting said line to said operator's position.

3. A permanent signal trunk in accordance with claim 2 further including means for controlling the disconnection of said tone generator from said subscriber line and the connection of said subscriber line to said operator's position at one of a plurality of discrete times after the connection of said tone generator to said subscriber line, said one discrete time being determined by the time the permanent signal subscriber line is first connected to said trunk.

4. A permanent signal trunk comprising first relay means operative in response to the connection thereto of a subscriber line, an announcement machine, a tone generator, an operator's position, a source of pulses of a first type, a source of pulses of a second type, second relay means operative in response to the first pulse of said first type occurring after the operation of said first relay means for connecting said announcement machine to said subscriber line, third relay means responsive to the operation of said second relay means, fourth relay means responsive to the second pulse of said first type and the prior operation of said third relay means for disconnecting said announcement machine from said subscriber line, for connecting said tone generator to said subscriber line, and for releasing said third relay means, means responsive to the first pulse of said second type occurring after the operation of said second relay means for releasing said second relay means, means responsive to the release of said second relay means for reoperating said third relay means, means responsive to the second pulse of said second type and the prior reoperation of said third relay means for releasing said fourth relay means thereby disconnecting said tone generator from said subscriber line, fifth relay means responsive to the release of said fourth relay means for connecting said subscriber line to said operator's position, and means responsive to an on-hook condition appearing on said subscriber line for releasing said first, third and fifth relay means and for disconnecting said subscriber line from said operator's position.

5. A permanent signal trunk having an operator's position and means for connecting a subscriber line to said operator's position responsive to the seizure of said trunk circuit by said subscriber line characterized by means for delaying the connection of said subscriber line to said operator's position, said delaying means including means for automatically connecting an announcement machine to said subscriber line responsive to the seizure of said trunk by said subscriber line, means for automatically disconnecting said announcement machine from said subscriber line, means for automatically connecting a tone generator to said subscriber line responsive to the disconnection of said announcement machine from said subscriber line, means for automatically disconnecting said tone generator from said subscriber line, and means for automatically connecting said subscriber line to said operator's position responsive to the disconnection of said tone generator from said subscriber line.

References Cited by the Examiner

UNITED STATES PATENTS 2,764,636 9/56 Gray ---------------- 179—27

ROBERT H. ROSE, *Primary Examiner.*

NEIL C. READ, *Examiner.*